(12) United States Patent
Nishimura et al.

(10) Patent No.: US 11,214,040 B2
(45) Date of Patent: Jan. 4, 2022

(54) RESIN MOLDED BODY

(71) Applicant: Shimano Inc., Osaka (JP)

(72) Inventors: Yasushi Nishimura, Osaka (JP);
Daisuke Yamanaka, Osaka (JP);
Wataru Yamauchi, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/564,641

(22) Filed: Sep. 9, 2019

(65) Prior Publication Data

US 2020/0101697 A1 Apr. 2, 2020

(30) Foreign Application Priority Data

Sep. 28, 2018 (JP) .............................. JP2018-183642

(51) Int. Cl.
*B32B 27/08* (2006.01)
*B32B 15/088* (2006.01)

(52) U.S. Cl.
CPC ............ *B32B 15/088* (2013.01); *B32B 27/08* (2013.01); *B32B 2250/05* (2013.01); *B32B 2255/10* (2013.01); *B32B 2255/205* (2013.01); *B32B 2307/732* (2013.01); *B32B 2451/00* (2013.01)

(58) Field of Classification Search
CPC .............. B32B 15/088; B32B 2250/05; B32B 2255/205; B32B 2307/732; B32B 2451/00; B32B 2255/10; B32B 1/00; B32B 27/365; B32B 27/308; B32B 7/12; B32B 27/302; B32B 27/32; B32B 27/36; B32B 27/08; B32B 33/00; B32B 3/06; B32B 5/02; B32B 15/08; B32B 2260/021; B32B 2307/412

USPC .......................................................... 428/457
See application file for complete search history.

(56) References Cited

U.S. PATENT DOCUMENTS

| 6,088,947 | A | * | 7/2000 | Suzue | ..................... | A01K 87/00 |
| | | | | | | 43/18.1 R |
| 10,093,777 | B2 | * | 10/2018 | Takebe | .................. | B29C 70/021 |
| 2008/0187717 | A1 | * | 8/2008 | Hort | .......................... | C23C 4/02 |
| | | | | | | 428/141 |
| 2016/0303824 | A1 | * | 10/2016 | Takebe | ..................... | B32B 5/26 |

FOREIGN PATENT DOCUMENTS

| DE | 101 13 273 A1 | | 9/2002 |
| JP | 61-35216 A | | 2/1986 |
| JP | 2015136319 A | * | 7/2015 |

OTHER PUBLICATIONS

Machine translation of JP 2015-136319 A (Year: 2015).*

* cited by examiner

*Primary Examiner* — Callie E Shosho
*Assistant Examiner* — Steven A Rice
(74) *Attorney, Agent, or Firm* — Global IP Counselors, LLP

(57) ABSTRACT

A resin molded body includes a body having a surface, and a decorative sheet adhered to the surface of the body. The decorative sheet has a metallic luster layer, a transparent protective layer positioned on an outer side of the metallic luster layer, and a welding layer adhered to the surface of the body. The body is formed from a fiber-reinforced resin having reinforcing fibers defining an anchor structuring layer such that the reinforcing fibers of the body bite into the welding layer at a boundary portion between the welding layer and the body such that the boundary portion has an uneven shape.

10 Claims, 10 Drawing Sheets

RESIN MOLDED BODY

CROSS-REFERENCE TO RELATED APPLICATIONS

This application claims priority to Japanese Patent Application No. 2018-183642, filed on Sep. 28, 2018. The entire disclosure of Japanese Patent Application No. 2018-183642 is hereby incorporated herein by reference.

BACKGROUND

Field of the Invention

The present invention relates to a resin molded body in which a decorative sheet having a metallic luster is adhered to the surface.

Background Art

A resin molded body having a metallic luster is lighter than metal articles. Japanese Laid-Open Patent Application No. S61(1986)-352169 proposes a method in which a sheet having a metallic luster is placed in an injection mold and is integrally molded with a resin as a method for imparting a metallic luster to a resin molded body.

SUMMARY

The object of the present invention is to provide a resin molded body that exhibits sufficient strength to withstand a large force and high sheet adhesiveness.

The resin molded body according to the present invention comprises a body and a decorative sheet that is adhered to a surface of the body, the decorative sheet having a metallic luster layer, a transparent protective layer positioned on the outer side of the metallic luster layer, and a welding layer positioned on the inner side of the metallic luster layer and that is welded on the surface of the body. The body is formed from fiber-reinforced resin having reinforcing fibers. An anchor structuring layer is configured at boundary between the welding layer and the body, and has an uneven shape such that the reinforcing fibers of the body bite into the welding layer.

Because the body is formed from fiber-reinforced resin, the resin molded body exhibits high strength, and even if a large force acts on the resin molded body, the resin molded body is capable of withstanding the force. In addition, since the body has the anchor structuring layer in which the reinforcing fibers of the body bite into the welding layer at boundary between the welding layer and the body such that the anchor structuring layer has an uneven shape, there is significant adhesion between the decorative sheet and the body. Therefore, even if a large force acts on the resin molded body, the metallic luster is maintained as well as the adhesion of the decorative sheet to the body.

Preferably, in one embodiment, the reinforcing fibers of the body bite into the welding layer randomly in the anchor structuring layer, which improves the anchoring effect.

Preferably, in one embodiment, the anchor structuring layer has a height difference greater than the fiber diameter of the reinforcing fibers, which improves the anchoring effect.

In addition, the anchor structuring layer preferably has a height difference of 20 μm or more, which improves the anchoring effect.

In particular, the resin molded body is suitable for a structural member of a bicycle or fishing gear.

As described above, since the body is formed from the fiber-reinforced resin which defines an anchor structuring layer such that the reinforcing fibers thereof bite into the welding layer side of the decorative sheet, it is possible for the decorative sheet to have a high connection strength that can withstand a large force and has high adhesion. Therefore, it is possible to use the resin molded body as an alternative to a metal article for which high strength and precision design are required, and it is possible to reduce the weight of the article.

DETAILED DESCRIPTION OF THE EMBODIMENT

A resin molded body according to one embodiment of the present invention is described below with reference to FIGS. 1 to 7. The resin molded body can be used for various purposes. In particular, the resin molded body is suitable for a structural member of a bicycle or of fishing gear. Examples include bicycle brake levers, cranks, rims, interior sprocket components, bicycle shoe soles, reel main bodies, reel spools, reel seats, and the like. The resin molded body is suitable for products having a metallic luster, and that are lightweight and strong.

Body 1

Figure 1:
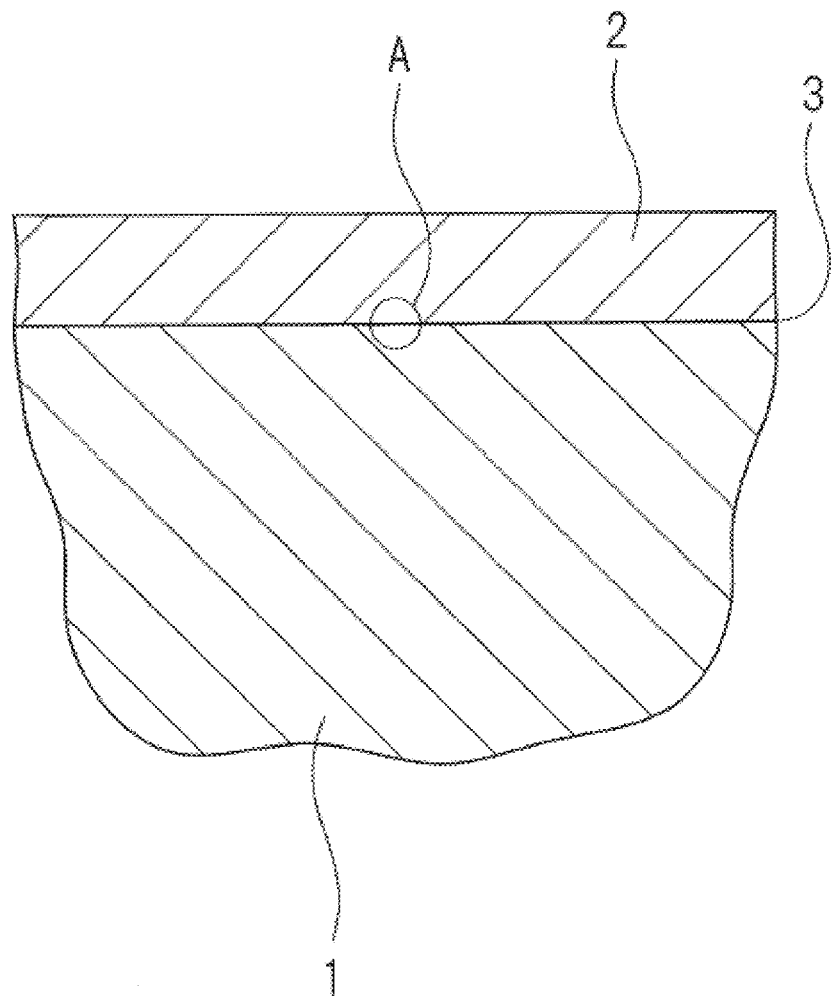
FIG. 1 is a cross-sectional view of a main part illustrating a resin molded body according to one embodiment of the present invention.

As shown in FIG. 1, the resin molded body comprises a body 1 and a decorative sheet 2 that is adhered to the surface of the body 1. The body 1 is formed from a fiber-reinforced resin. The reinforcing fibers 10 of the body 1 are carbon fibers or glass fibers, for example. The reinforcing fibers 10 can be cut to several millimeters or to several tens of millimeters, or be long fibers. The body 1 can be formed by various molding methods. Examples of the molding method for the body 1 include injection molding that uses the reinforcing fibers 10 cut to several millimeters, SMC molding that uses the reinforcing fibers 10 cut to several tens of millimeters, molding by a prepreg that uses long fibers, and the like. The material of the resin of the body 1 can be a material suitable for various moldings. The material of the resin of the body 1 can be various thermoplastic resins or thermosetting resins. The material of the resin of the body 1 can be, for example, various resins for injection molding in the case of injection molding, thermoplastic resins such as epoxy resin in the case of using a prepreg, and nylon resin, epoxy resin, vinyl ester resin, or the like in the case of SMC molding. The body 1 of the present embodiment is molded by injection molding. Short fibers cut to a length of several millimeters, in particular, to a length of 1 mm or less, are used as the reinforcing fibers 10. Polyamide resin (nylon) is used as the resin.

Decorative Sheet 2

Figure 2:
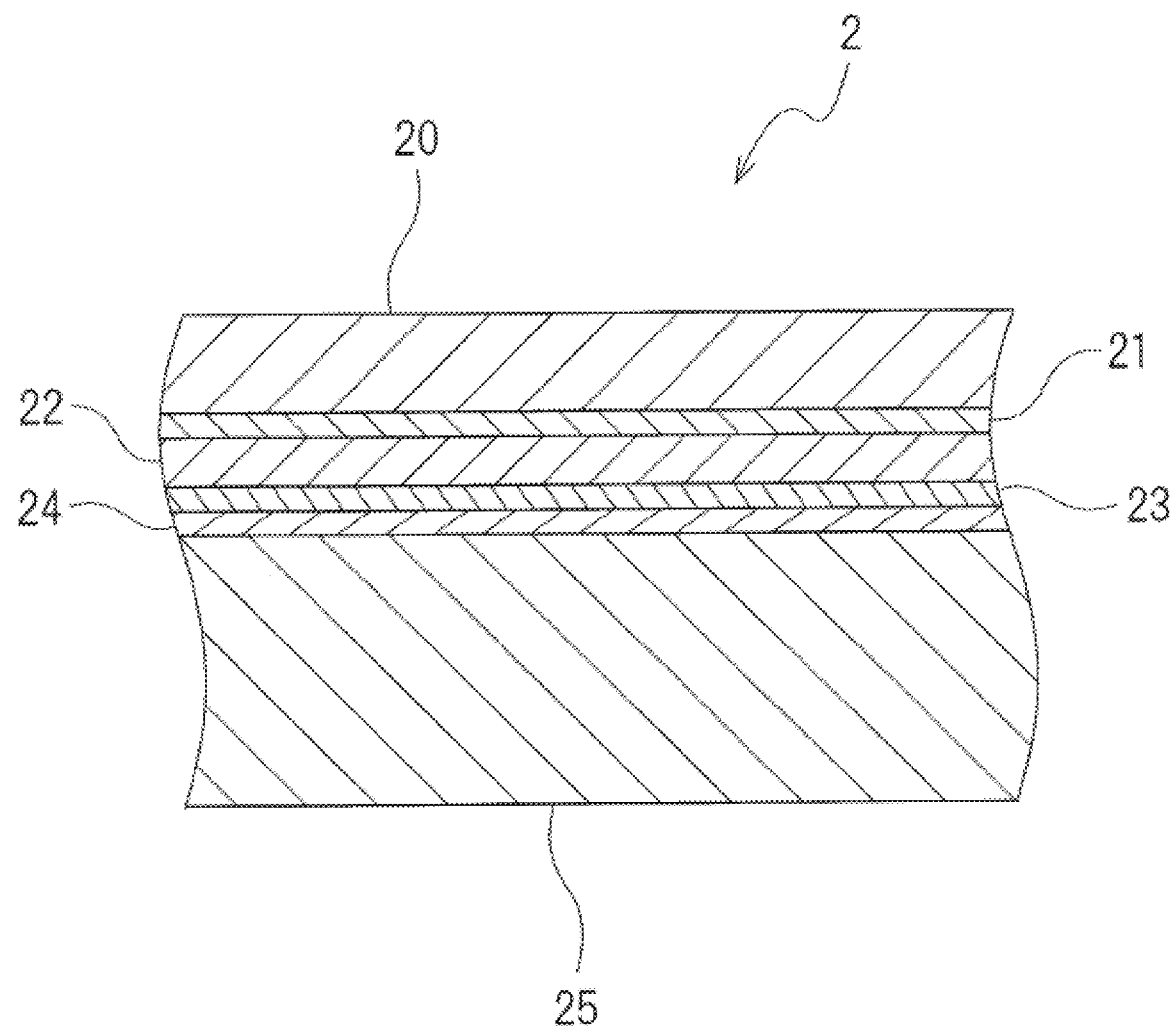
FIG. 2 is a cross-sectional view of the main part illustrating a decorative sheet used in the resin molded body.

The decorative sheet 2 is adhered to the surface of the body 1. The decorative sheet 2 can be integrated with the surface of the body 1 when the body 1 is molded. One example of the decorative sheet 2 is shown in FIG. 2. The decorative sheet 2 has a protective layer 20, a first adhesive layer 21, a support layer 22, a metallic luster layer 23, a second adhesive layer 24, and a welding layer 25. The protective layer 20 is positioned on the outermost surface of the decorative sheet 2. The protective layer 20 is the outermost layer of the decorative sheet 2. The protective layer 20 can be transparent and can have a transparency of a degree that allows at least visual recognition of the metallic luster layer 23. The protective layer 20 preferably has excellent wear resistance and weather resistance. The protective layer 20 can be composed of various resin films. The thickness of the film of the protective layer 20 can be several tens of μm, for example. Examples of the resin of the film of the protective layer 20 include acrylic resins such as polymethyl methacrylate (PMMA) resin and polycarbonate (PC) resin. The first adhesive layer 21 can be a layer for bonding the protective layer 20 and the support layer 22. The protective layer 20 can be stacked on the outer side (surface side) of the support layer 22 with the first adhesive layer 21 interposed therebetween. Various adhesives are used for the first adhesive layer 21. The first adhesive layer 21 can be transparent and can have a transparency of a degree that enables at least visual recognition of the metallic luster layer 23. The first adhesive layer 21 may be colorless and transparent, or colored and transparent.

The support layer 22 is a layer for holding the metallic luster layer 23. The support layer 22 can be composed of various resin films. The thickness of the film of the support layer 22 can be several tens of μm, for example, and the film of the support layer 22 is generally thinner than the film of the protective layer 20. The resin of the film of the support layer 22 is a polyester resin, such as PET. The metallic luster layer 23 is a metal vapor deposition layer, a metal foil, a metal-colored coating film, or the like. A metal-colored coating film can be composed of metal nanoparticles. Examples of the metal nanoparticles include silver, gold, copper, nickel, chromium, platinum, palladium, titanium, tin, and alloys thereof, and any one or a mixture thereof is used. The metal-colored coating film can be formed by various printing methods, such as coater coating, gravure printing, inkjet printing, or the like. The metallic luster layer 23 according to the present embodiment is a metal vapor deposition layer formed on one side of the support layer 22. The metal vapor deposition layer is formed on one side of the resin film as the support layer 22, and the protective layer 20 is stacked on the outer side of the resin film with the metal vapor deposition layer, with the first adhesive layer 21 interposed therebetween.

The second adhesive layer 24 is a layer for bonding the metallic luster layer 23 and the welding layer 25. Various adhesives are used for the second adhesive layer 24, in the same manner as the first adhesive layer 21. The welding layer 25 is stacked on the inner side (back side) of the metallic luster layer 23 with the second adhesive layer 24 interposed therebetween. The welding layer 25 is a layer that serves as the base of the decorative sheet 2 and is a thermoplastic resin layer. The welding layer 25 is the thickest layer of the layers constituting the decorative sheet 2. The thickness of the welding layer 25 is several hundred μm, for example. The welding layer 25 is the innermost layer of the decorative sheet 2. The welding layer 25 is adhered to the surface of the body 1 when the body 1 is molded. The welding layer 25 can be composed of various resins and/or composed of various resin films. For example, the welding layer 25 can be composed of a film of ABS resin, polypropylene resin, polycarbonate resin, or the like.

For example, the decorative sheet 2 is placed in a molding die for injection molding, etc., after being preformed by sheet molding, such as vacuum pressure forming. In addition, the decorative sheet 2 with a flat plate shape can be set in a molding die for injection molding, etc., the decorative sheet 2 can be formed into a prescribed shape in the molding die so as to match the shape of the molding die, and the resin for the body 1 may be subsequently injected into the molding die to thereby form the body 1.

Anchor Structuring Layer 30

Figure 3:
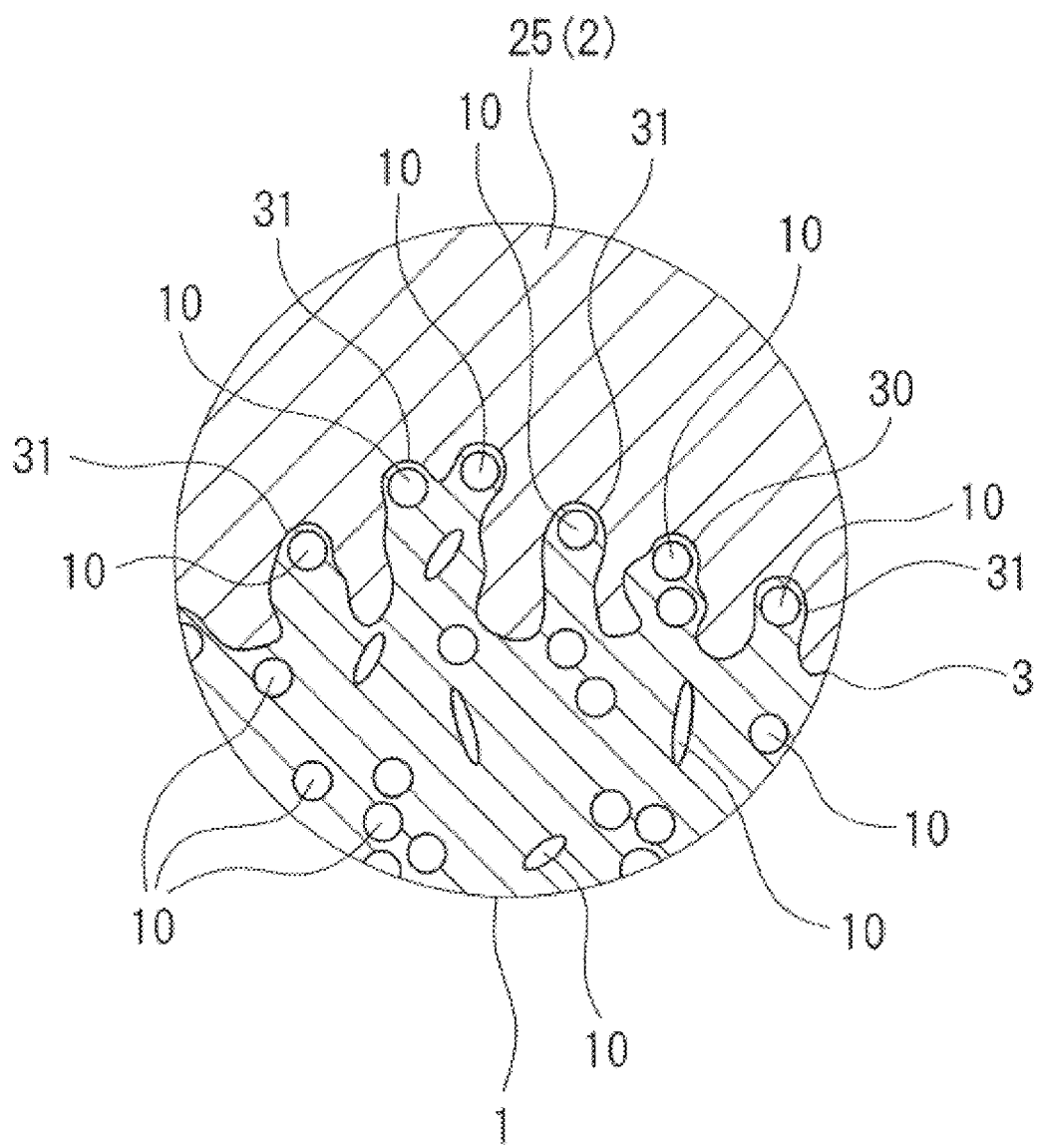
FIG. 3 is an enlarged view of part A in FIG. 1.

As shown in the enlarged view of FIG. 3, the resin molded body has an anchor structuring layer 30 in a boundary portion 3 between the body 1 and the decorative sheet 2. The boundary portion 3 between the body 1 and the decorative sheet 2 is the interface between the body 1 and the decorative sheet 2 and is the adhesion surface. The anchor structuring layer 30 is a structure in which the reinforcing fibers 10 of the body 1 bite into the welding layer 25 such that the boundary portion 3 has an uneven shape. The reinforcing fibers 10 bite randomly into the welding layer 25. Therefore, the unevenness of the anchor structuring layer 30 is not regular but irregular. If the welding layer 25 is convex; the size, orientation, and shape of the convex portion 31 of the anchor structuring layer 30 are not constant. Some of the convex portions 31 of the anchor structuring layer 30 are themselves complex in shape with small irregularities. The convex portion 31 of the anchor structuring layer 30 is formed by the biting of the reinforcing fibers 10 into the welding layer 25. Therefore, the convex portion 31 of the anchor structuring layer 30 includes the reinforcing fibers 10. The reinforcing fibers 10 are positioned at the distal end portion of the convex portion 31 of the anchor structuring layer 30.

The unevenness of the anchor structuring layer 30 preferably has a height difference greater than the fiber diameter of the reinforcing fibers 10. In particular, the unevenness of the anchor structuring layer 30 preferably has a height difference approximately several times the fiber diameter of the reinforcing fibers 10. The fiber diameter of the reinforcing fibers 10 is about 10 μm, for example. The unevenness of the anchor structuring layer 30 preferably has a height difference of 20 μm or more, and particularly preferably a height difference of 50 μm or more. For example, when the thickness of the welding layer 25 is about 200-300 μm, the unevenness of the height difference of the anchor structuring layer 30 is about 10%, but can be 10% or more. Even when the thickness of the welding layer 25 is greater, the unevenness of the height difference of the anchor structuring layer 30 is often not that different.

Figure 4:
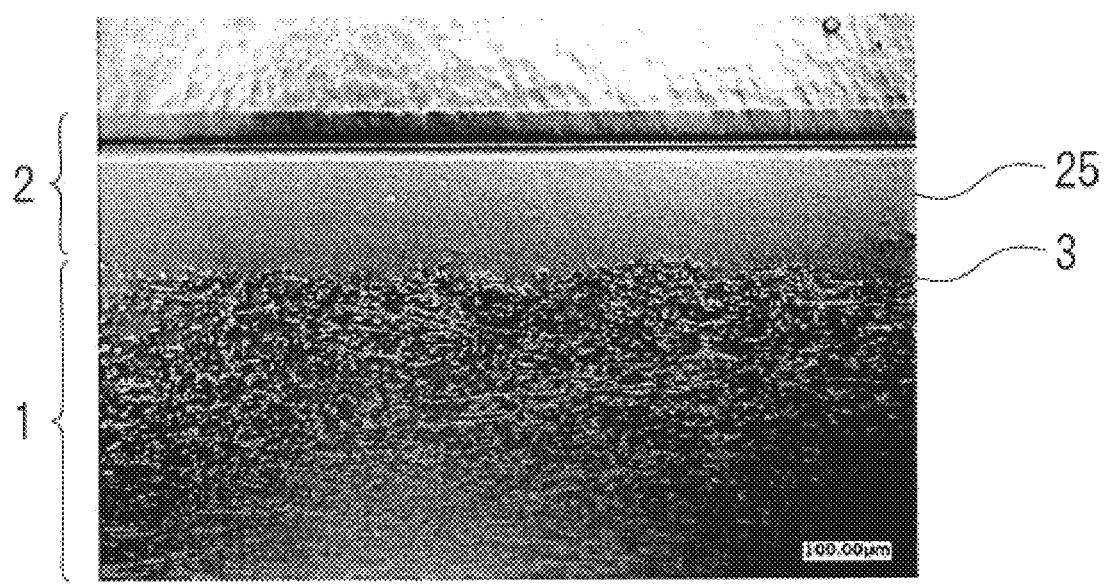
FIG. 4 is a photograph as a substitute for a figure illustrating the vicinity of the surface of the resin molded body.
Figure 5:
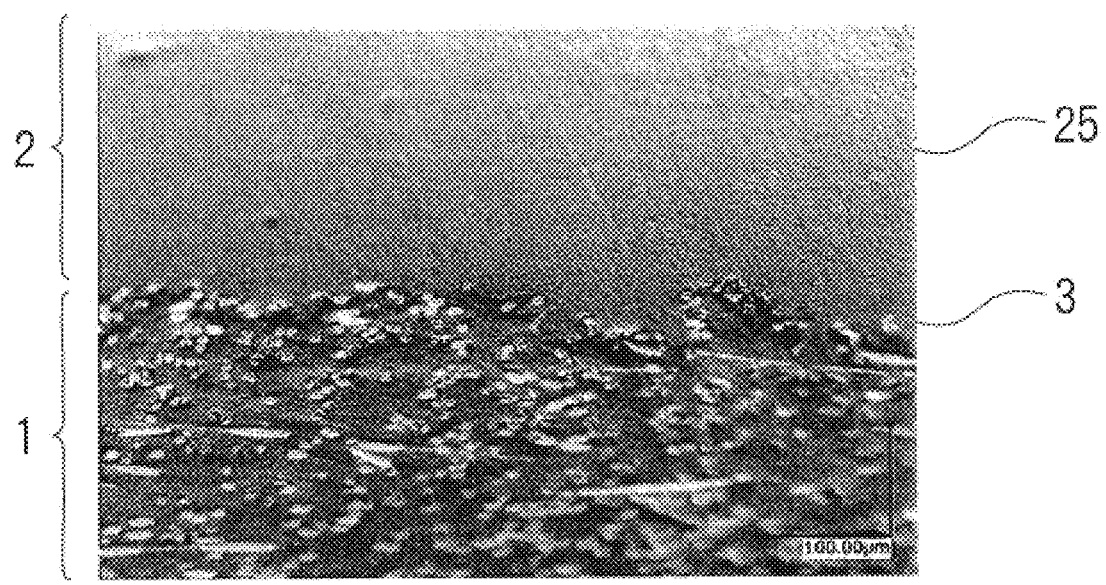
FIG. 5 is a photograph as a substitute for a figure illustrating the vicinity of the surface of the resin molded body.
Figure 6:
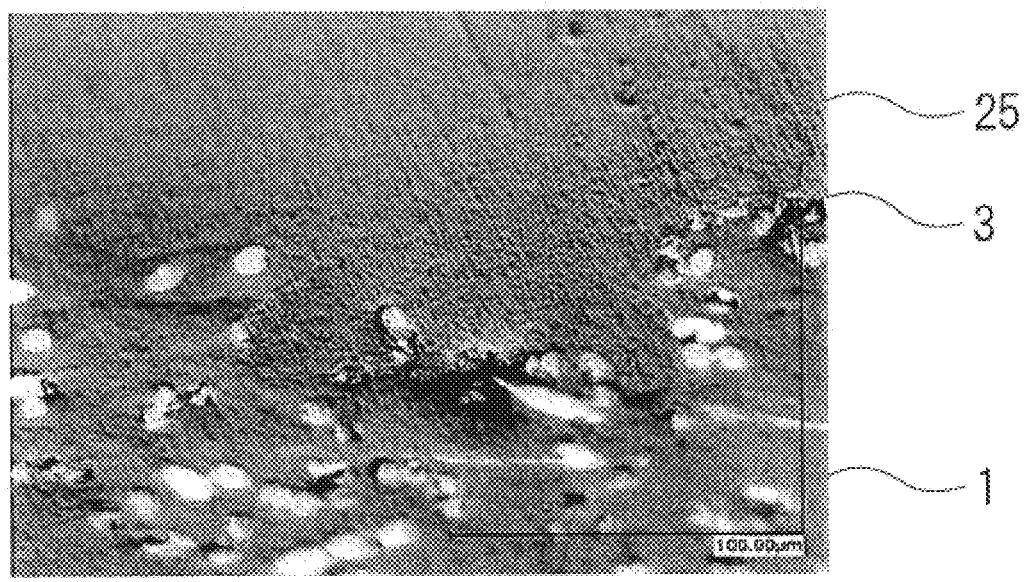
FIG. 6 is a photograph as a substitute for a figure illustrating the vicinity of the surface of the resin molded body.
Figure 7:
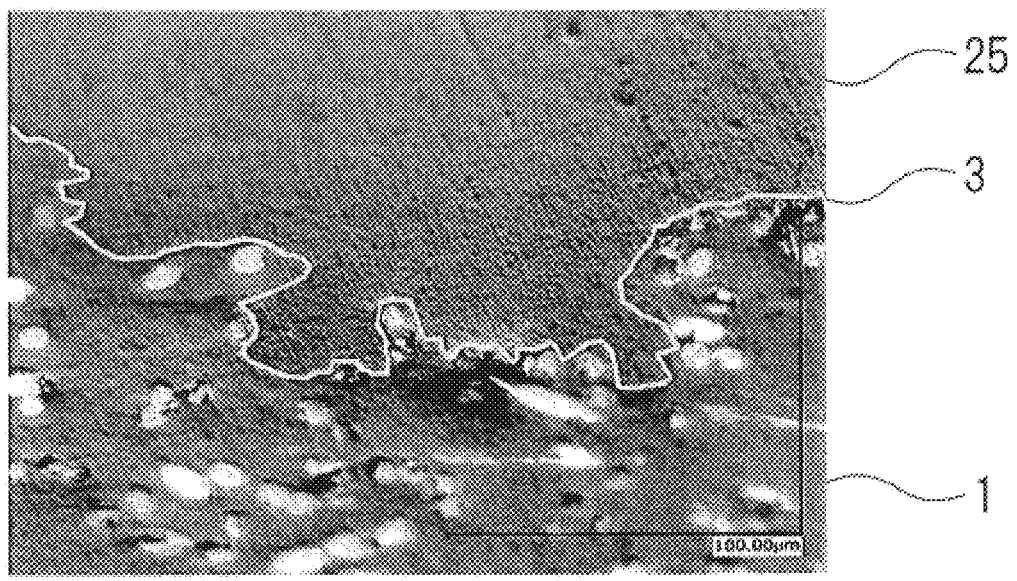
FIG. 7 is a photograph as a substitute for a figure illustrating the vicinity of the surface of the resin molded body.

FIGS. 4 to 7 show enlarged photographs of the cut sections of the resin molded body. ABS resin film is used for the welding layer 25. The body 1 is formed by mixing short fibers, obtained by cutting carbon fibers to a length of 1 mm or less, with polyamide resin and carrying out injection molding. The magnification in FIG. 4 is 200×, the magnification in FIG. 5 is 500×, and the magnification in FIG. 6 is 1500×. FIG. 7 is a photograph in which a line is drawn on the boundary portion 3 between the welding layer 25 and the body 1 in the photograph of FIG. 6. In the photograph, the reinforcing fibers 10 of the body 1 have a white, shiny appearance.

As shown in FIG. 4, the boundary portion 3 between the welding layer 25 and the body 1 undulates considerably. As shown in FIGS. 6 and 7, the reinforcing fibers 10 of the body 1 bite into the welding layer 25 of the decorative sheet 2 randomly, and the form of the biting of the reinforcing fibers 10 is the undulation, i.e., the unevenness, of the boundary portion 3. The location shown in the photograph exhibits the formation of an uneven shape having a height difference of about 30-50 μm.

Figure 8:
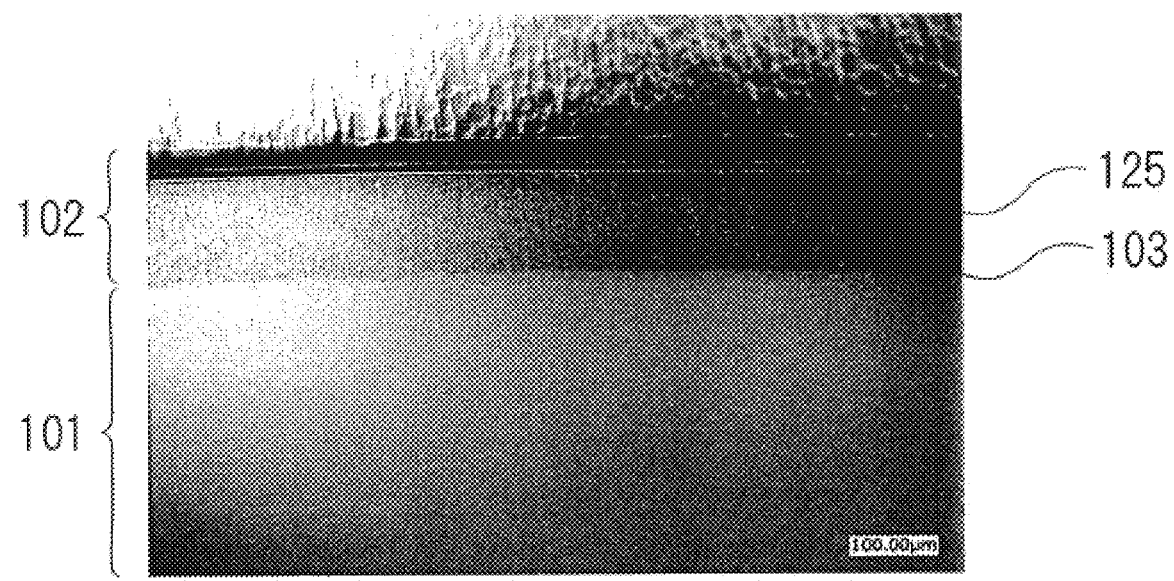
FIG. 8 is a photograph as a substitute for a figure illustrating the vicinity of the surface of a resin molded body as a comparative example.
Figure 9:
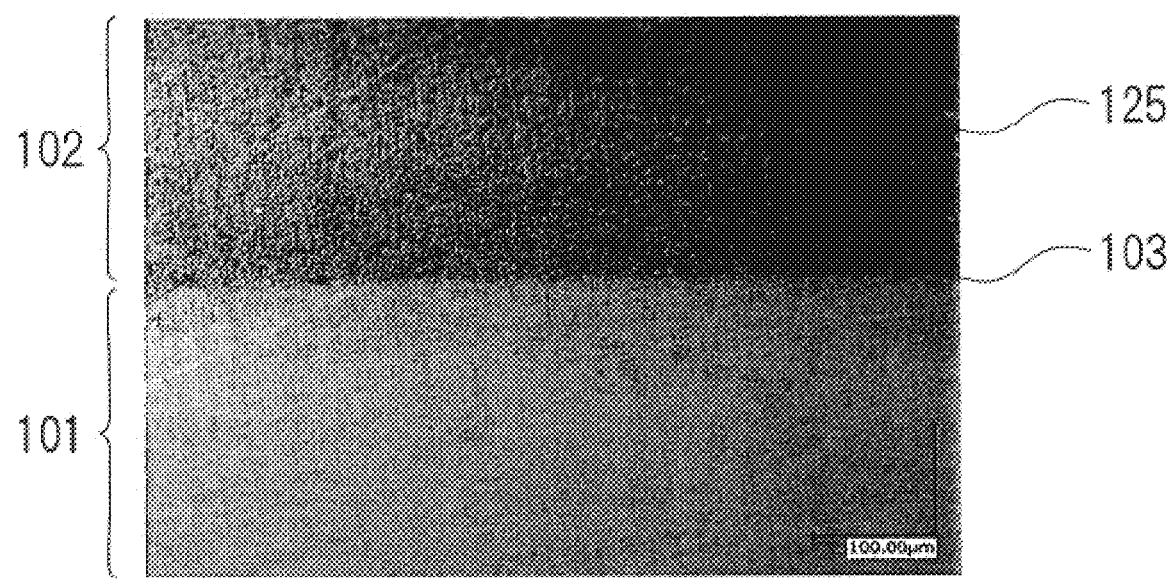
FIG. 9 is a photograph as a substitute for a figure illustrating the vicinity of the surface of a resin molded body as a comparative example.
Figure 10:
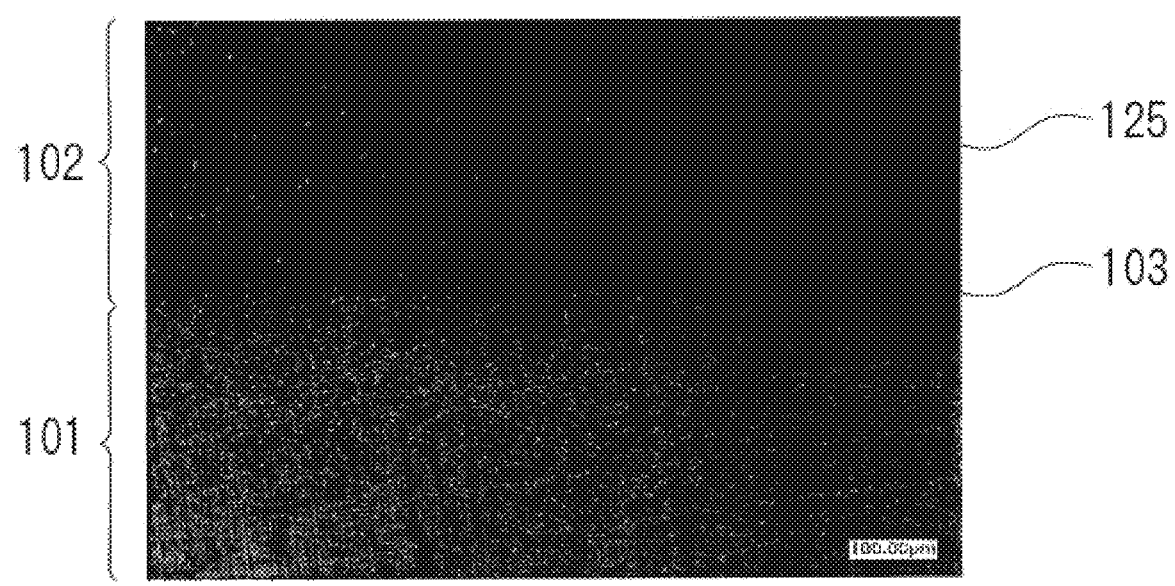
FIG. 10 is a photograph as a substitute for a figure illustrating the vicinity of the surface of a resin molded body as a comparative example.

FIGS. 8 to 10 show enlarged photographs of the cut sections of a resin molded body as a comparative example. With respect to the resin molded body shown in FIGS. 4 to 7 above, the resin molded body of this comparative example has the same decorative sheet 102 but the material of the resin of a body 101 is different. The body 101 of the resin molded body in the comparative example is injection-molded from ABS resin, and does not contain the reinforcing fibers 10. The magnifications of FIGS. 8 to 10 are, respectively, 200×, 500×, and 1500×, which are the same as FIGS. 4 to 6. In the resin molded body of the comparative example, a boundary portion 103 between the body 101 and an welding layer 125 of the decorative sheet 102 is flat, and has a planar shape with extremely small irregularities.

As stated above, since the body 1 of the resin molded body of the present embodiment is made up of fiber-reinforced resin, high strength can be obtained. Therefore, even if a large force acts on the resin molded body, the resin molded body can withstand such a force. In addition, since the anchor structuring layer 30 in which the reinforcing fibers 10 bite into the welding layer 25 is disposed at the boundary portion 3 between the welding layer 2 and the body 1, there is significant adhesions between the decorative sheet 2 and the body 1. Therefore, even when a large force acts on the resin molded body, the metallic luster as well as the adhesion of the decorative sheet 2 to the body 1 are maintained. In this manner, since high strength and metallic luster due to the high adhesiveness of the decorative sheet 2 can be obtained, it is possible to use the resin molded body as an alternative to a metal article, and it is possible to reduce the weight of the article. In particular, if the resin molded body is configured as a structural member of a bicycle or fishing gear on which a large force acts, it is be possible to reduce the weight of the structural member while maintaining the strength and the aesthetic appearance of the structural member.

What is claimed is:

1. A resin molded body, comprising:
    a body formed from a fiber-reinforced resin having reinforcing fibers and having a surface;
    a decorative sheet adhered to the surface of the body, the decorative sheet having a metallic luster layer, a transparent protective layer positioned on an outer side of the metallic luster layer, and a welding layer welded on the surface of the body positioned on an inner side of the metallic luster layer; and
    an anchor structuring layer being configured at a boundary between the welding layer and the body, and having an uneven shape such that the reinforcing fibers of the body bite into the welding layer, the anchor structuring layer having a height difference greater than a fiber diameter of the reinforcing fibers with the reinforcing fibers of the body disposed on only a body side of the boundary such that the reinforcing fibers are only present in the anchor structuring layer.

2. The resin molded body according to claim 1, wherein the reinforcing fibers of the body bite into the welding layer randomly in the anchor structuring layer.

3. The resin molded body according to claim 1, wherein the anchor structuring layer has a height difference of 20 μm or more.

4. The resin molded body according to claim 1, wherein the resin molded body is a structural member of a bicycle or fishing gear.

5. The resin molded body according to claim 1, wherein an outer surface of the welding layer is adhered directly to an inner surface of the metallic luster layer.

6. The resin molded body according to claim 1, wherein the decorative sheet is configured to be positioned within a molding die and overmolded to the body, such that the welding layer is welded to the surface of the body.

7. The resin molded body according to claim 1, wherein the reinforcing fibers have a length of 1 mm or less.

8. The resin molded body according to claim 1, wherein the uneven shape of the anchor structuring layer is irregular.

9. The resin molded body according to claim 1, wherein the uneven shape of the anchor structuring layer has convex portions biting into the welding layer.

10. The resin molded body according to claim 9, wherein the reinforcing fibers of the body are disposed within the convex portions.

* * * * *